United States Patent
Zhou

(10) Patent No.: US 6,895,040 B2
(45) Date of Patent: May 17, 2005

(54) ARCHITECTURE FOR A DIGITAL SUBSCRIBER LINE ANALOG FRONT END

(75) Inventor: Yan Zhou, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 439 days.

(21) Appl. No.: 09/847,187

(22) Filed: May 1, 2001

(65) Prior Publication Data

US 2003/0012288 A1 Jan. 16, 2003

(51) Int. Cl.$^7$ ................................................. H04L 5/16
(52) U.S. Cl. ..................... 375/220; 375/222; 375/258; 375/285; 375/346; 370/282; 379/402; 455/296
(58) Field of Search ................................. 375/219, 220, 375/222, 289, 285, 257–259, 346, 350; 370/282, 286, 268, 269, 292; 379/202, 406, 410, 411; 455/63, 296, 302, 307

(56) References Cited

U.S. PATENT DOCUMENTS

| 6,226,331 B1 | * | 5/2001 | Gambuzza | ................... | 375/258 |
| 6,266,367 B1 | * | 7/2001 | Strait | ......................... | 375/229 |
| 6,281,829 B1 | | 8/2001 | Amrany et al. | | |
| 6,295,343 B1 | * | 9/2001 | Hjartarson et al. | ...... | 379/93.05 |
| 6,477,249 B1 | * | 11/2002 | Williamson et al. | ... | 379/399.01 |
| 6,498,511 B2 | * | 12/2002 | Tamura et al. | ................ | 326/86 |
| 6,542,477 B1 | | 4/2003 | Pal et al. | | |
| 2001/0021250 A1 | | 9/2001 | Vanderbauwhede et al. | | |

* cited by examiner

*Primary Examiner*—Dac V. Ha
(74) *Attorney, Agent, or Firm*—Davis & Associates; William D. Davis

(57) ABSTRACT

An analog front end for communicating discrete multitone modulated signals on a subscriber line includes a transmit block, a receive block, and a hybrid packaged within a same integrated circuit. Upstream data to be transmitted to the subscriber line is pre-processed to eliminate even images. A power spectral density shaping filter subsequently substantially eliminates undesired energy in the upstream data signal. A high pass filter further rejects upstream data from the downstream data signal. The power spectral density filter and the high pass filter enable the use of a first order hybrid network for extracting the downstream data. The analog front end may include an additional analog channel to enable voiceband (e.g., v.90) communication concurrent with non-voiceband (e.g., xDSL) operation. Sample rate conversion is utilized to avoid the use of multiple independent clocks for otherwise incompatible clocking requirements.

10 Claims, 12 Drawing Sheets

900

| | A->D | | | D->A | |
|---|---|---|---|---|---|
| $f_i$ | M/N | OPT M/N | $f_{audio}$ | N/M | N/M·$f_{audio}$ |
| 7200 | 8/6 | 16/12 | 9600 | 12/16 | 7200 |
| 8000 | 6/5 | 6/5 | 9600 | 5/6 | 8000 |
| 8229 | 7/6 | 14/12 | 9600 | 12/14 | 8228.57 |
| 8400 | 8/7 | 16/14 | 9600 | 14/16 | 8400 |
| 9000 | 16/15 | 16/15 | 9000 | 15/16 | 9000 |
| 9600 | 1/1 | 16/16 | 9600 | 16/16 | 9600 |
| 10,286 | 14/15 | 14/15 | 9600 | 15/14 | 10,285.71 |

FIG. 9

ARCHITECTURE FOR A DIGITAL SUBSCRIBER LINE ANALOG FRONT END

FIELD OF THE INVENTION

This invention relates to the field of telecommunications. In particular, this invention is drawn to combining digital and analog telecommunications functions.

BACKGROUND OF THE INVENTION

Numerous communication protocol standards have developed to enable using the pre-existing plain old telephone system (POTS) infrastructure for carrying digital data. Although the public switched telephone network (PSTN) is digital in nature, the connection between subscribers and the central office which serves as an entry point to the PSTN is analog. As a result, modems are used for bi-directional communication of digital data on the analog channel between the subscriber and the central office. Modems convert the communicated information between the digital and analog domains in accordance with the particular communication protocol.

Some communication protocols are designed to rely on the voiceband region of the analog channel to convey information. As a result, when a subscriber line is in use by such a voiceband modem, the line is unavailable for simultaneous voice communications.

Digital subscriber lines (xDSL) services can provide significantly higher data transmission rates by utilizing communication bandwidth beyond but excluding the voiceband. As a result, xDSL services may simultaneously co-exist with voiceband communications.

Modems or other devices designed for communicating digital data on the analog channel utilize an analog front end for transmitting as well as receiving information from the subscriber line. The analog front end conditions signals communicated to or from the subscriber line before providing the conditioned signal to the subscriber line for transmission or to a digital signal processor for interpretation.

A hybrid circuit, for example, is used to address echoes resulting from using the same two wires for both transmission and reception on the analog channel. One disadvantage of typical hybrid designs is that the high order introduces distortion and noise into the system.

Preferably, a modem has the ability to support the higher data rates of xDSL when available. Due to the geographical limitations on xDSL, voiceband modems are still needed to ensure a reliable means of communication. One risk averse solution implements the functionality of voiceband and xDSL modems through the use of a chipset mounted on a common circuit board.

The combination of the circuitry onto a common board introduces new problems. In particular, the voiceband and xDSL modems rely on clocks of different frequencies which are not multiples of each other. The interaction between two clocks, for example, may result in intermodulation, synchronization problems, or other issues which interfere with the digital signal processor's ability to properly interpret received information.

SUMMARY OF THE INVENTION

Methods and apparatus incorporated into an analog front end for communicating with a subscriber line enable a high degree of integration.

Upstream data to be transmitted to a subscriber line is pre-processed to eliminate even images. A power spectral density shaping filter subsequently substantially eliminates undesired energy in the upstream data signal. A tunable hybrid network is coupled to the subscriber line and the transmit block to extract downstream data from the subscriber line. A high pass filter further rejects upstream data from the downstream data signal. The power spectral density shaping filter and the high pass filter enable the use of a tuned low order hybrid network to achieve adequate near end echo cancellation. The analog front end may include an additional analog channel to enable voiceband (e.g., v.90) communication concurrent with non-voiceband (e.g., xDSL) operation. Sample rate conversion is utilized to avoid the use of multiple independent clocks for otherwise incompatible clocking requirements.

One embodiment of an analog front end apparatus includes a transmit block coupled to transmit discrete multitone modulated upstream data to a subscriber line. A hybrid network is coupled to the subscriber line and the transmit block. A receive block is coupled to the hybrid for receiving discrete multitone modulated downstream data from the subscriber line. The transmit block, hybrid network, and receive block reside within a same integrated circuit package.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 9 illustrates a table of upsampling and downsampling factors for realizing various clock rates from a universal conversion rate.

DETAILED DESCRIPTION

The International Telecommunication Union (ITU) has set forth a series of recommendations for subscriber line data transmission. These recommendations are directed towards communications using the voiceband portion of the communications spectrum ("V.x" recommendations) as well as communications utilizing frequency spectrum other than the voiceband portion (e.g., "xDSL" recommendations).

The V.x recommendations have evolved over time to support ever higher data rates. ITU-T Recs. V.22 bis, V.32, V.32 bis, V.34, and V.90, for example, relate to increasing bit-per-second data rates of 2400, 9600, 14400, 33600, and 56000 bit/sec. Compression standards such as V.42 bis can further increase the effective data rates. Generally, voiceband modems will use a recommended handshaking protocol to negotiate the highest possible data rate.

ITU documentation for the more recent recommendations related to voiceband communications includes "Rec. V.90 (September 1998)—A digital modem and analogue modem pair for use on the Public Switched Telephone Network (PSTN) at data signalling rates of up to 56,000 bit/s downstream and up to 33,600 bit/s upstream," "Rec. V.34 (February 1998)—A modem operating at data signalling rates of up to 33 600 bit/s for use on the general switched telephone network and on leased point-to-point 2-wire telephone-type circuits," "Rec. V.32 bis (February 1991)—A duplex modem operating at data signalling rates of up to 14 400 bit/s for use on the general switched telephone network and on leased point-to-point 2-wire telephone-type circuits," and "Rec. V.32 (March 1993)—A family of 2-wire, duplex modems operating at data signalling rates of up to 9600 bit/s for use on the general switched telephone network and on leased telephone-type circuits."

Asymmetric digital subscriber line (ADSL) communications represent one variant of xDSL communications. Exemplary ADSL specifications are set forth in "Rec. G.992.2 (June 1999) Splitterless asymmetric digital subscriber line (ADSL) transceivers" (also referred to as full rate ADSL), and "Rec. G.992.1 (June 1999)—Asymmetric digital subscriber line (ADSL) transceivers" (also referred to as G.LITE).

Figure 1:
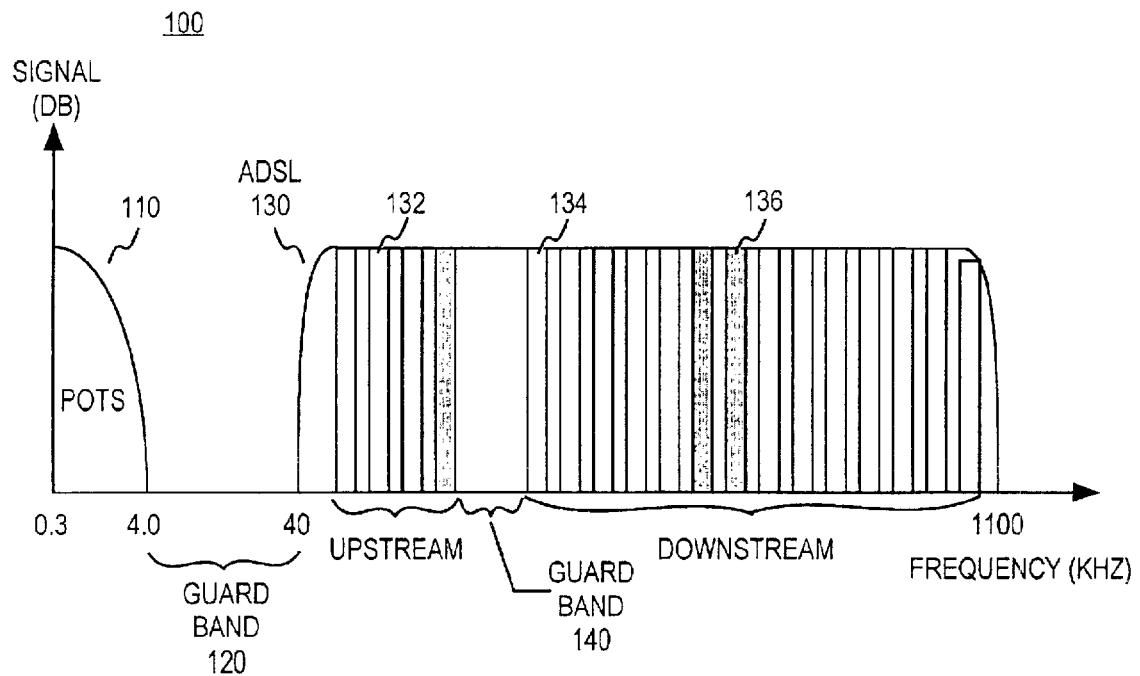
FIG. 1 illustrates the communication spectrum allocated for a subscriber line.

FIG. 1 illustrates the communication spectrum allocation for a subscriber line. Chart 100 compares the portions of the analog channel used by voiceband modems (POTS 110) as well as xDSL modems (ADSL 130). POTS communications typically use the voiceband range of 300–4000 Hz. ADSL is in a range of approximately 25–1100 KHz. A guard band 120 separates the POTS and ADSL ranges.

There are multiple line coding variations for xDSL. Carrierless Amplitude Phase (CAP) and Discrete Multi-Tone modulation both use the fundamental techniques of quadrature amplitude modulation (QAM). CAP is a single carrier protocol where the carrier is suppressed before transmission and reconstructed at the receiving end. DMT is a multicarrier protocol. FIG. 1 illustrates DMT line coding.

DMT modulation has been established as a standard line code for ADSL communication. The available ADSL bandwidth is divided into 256 sub-channels. Each sub-channel 134 is associated with a carrier. The carriers (also referred to as tones) are spaced 4.3125 KHz apart. Each sub-channel is modulated using quadrature amplitude modulation (QAM) and can carry 0–15 bits/Hz. The actual number of bits is allocated depending upon line conditions. Thus individual sub-channels may be carrying different numbers of bits/Hz. Some sub-channels 136 might not be used at all. ADSL uses some sub-channels 134 for downstream communication and other sub-channels 132 for upstream communication. The upstream and downstream sub-channels may be separated by another guard band 140.

During initialization DMT measures the signal-to-noise ratio of each sub-channel to assign a data rate. Generally, greater data rates (i.e., more bits/Hz) are assigned to the lower sub-channels because signals are attenuated more at higher frequencies. DMT implementations may also incorporate rate adaption to monitor the line conditions and dynamically change the data rate for sub-channels.

Figure 2:
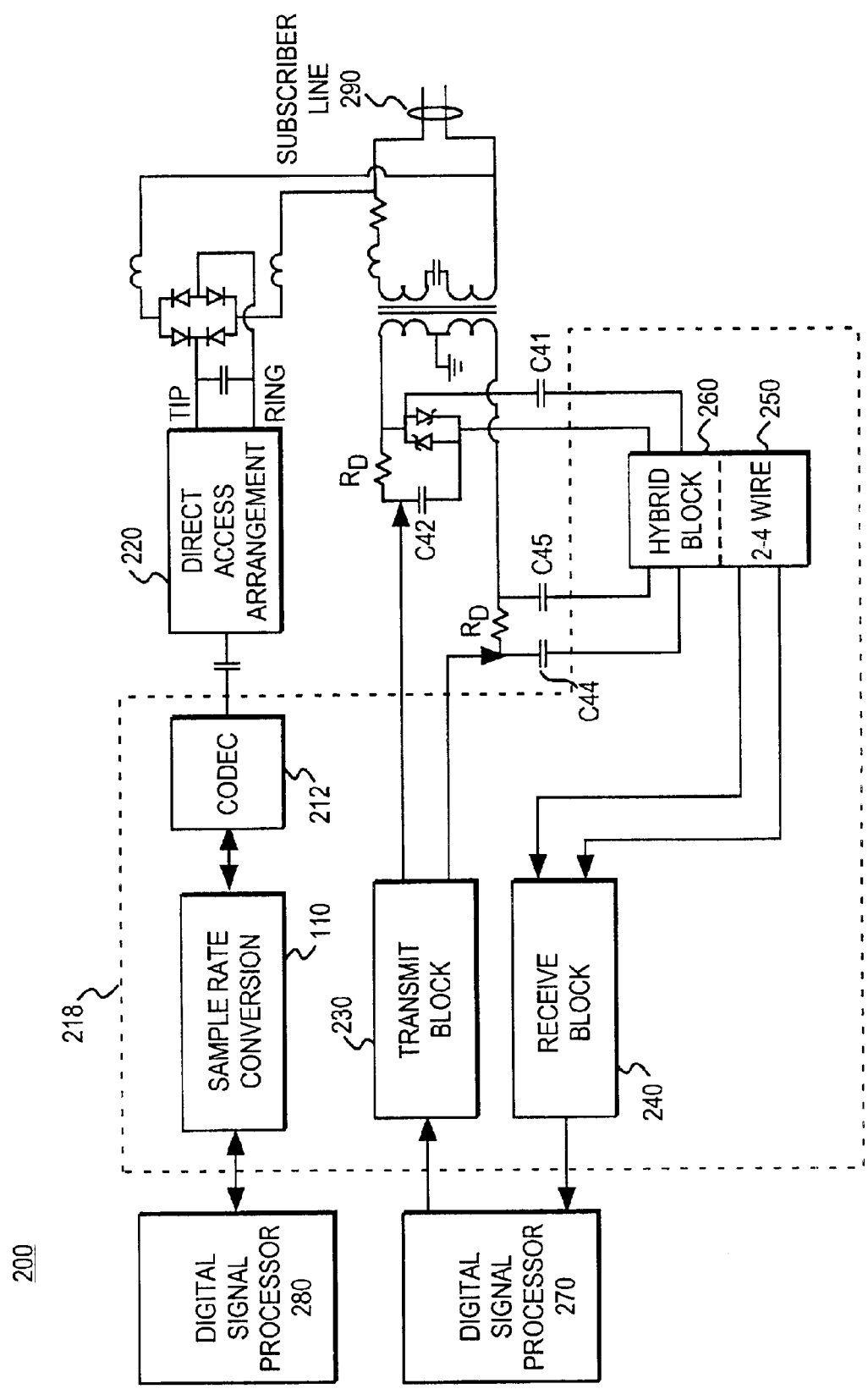
FIG. 2 illustrates an analog front end for communication with a subscriber line.

FIG. 2 illustrates an analog front end for communicating information on an analog channel carried by a subscriber line between a subscriber and the central office. In one embodiment, the analog front end includes circuitry for handling voiceband as well as non-voiceband (i.e., xDSL) communications. The analog front end conditions signals communicated between the subscriber line 290 and digital signal processors 270, 280.

In one embodiment, the analog front end 218 (including hybrid 260) is provided on a single substrate within an integrated circuit package. Within the integrated circuit, non-voiceband communication (e.g., xDSL) is handled by transmit block 230, receive block 240, 2-4 wire block 250, and hybrid 260. The hybrid and 2-4 wire conversion functions may be combined into a common hybrid network block as illustrated. In one embodiment, the analog front end is implemented as complementary metal oxide semiconductor (CMOS) circuitry within the integrated package. The integrated circuit may further comprise additional circuitry to support voiceband communications within the same integrated circuit package. For example, sample rate converter 210 and codec 212 may be incorporated onto the same substrate as the xDSL circuitry.

The high level of integration of the analog front end is enabled predominately by four features. First, in order to ease filtering, digital signal processor 270 eliminates even images of the upstream signal through the use of a Fast Fourier Transform (FFT). Second, a power spectral density shaping filter is used to further reduce unwanted images. These first two features ensure compliance with ITU specified transmit power spectrum density requirements. Third, the combination of the double rate FFT and power shaping enable the use of a low order hybrid rather than a higher order distortion inducing hybrid. The hybrid is tunable to permit accommodation of varying line conditions and downstream distortion. Fourth, a high pass filter following the hybrid provides additional rejection of the transmit signal in the receive path.

Figure 3:
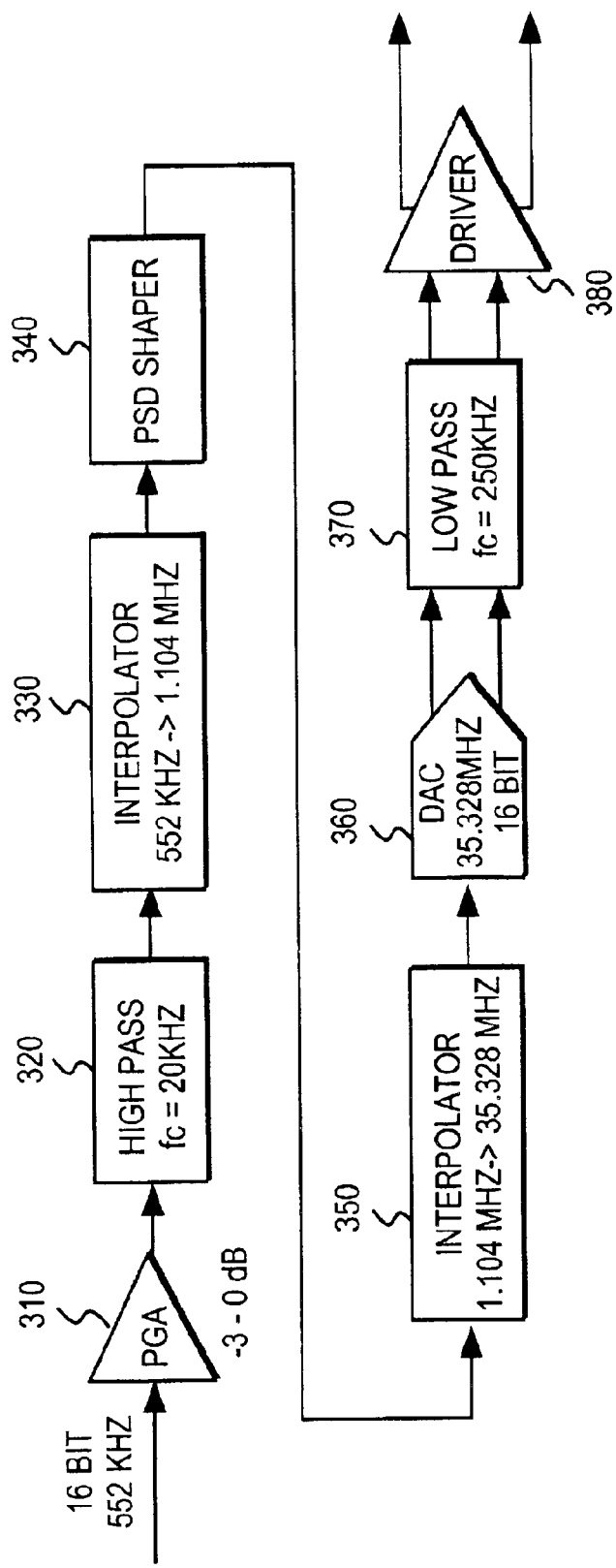
FIG. 3 illustrates the analog front end transmit block.

Digital signal processor (DSP) 270 provides information in digital form to the transmit block 230 for communication on the analog channel of the subscriber line. FIG. 3 illustrates transmit block 230 in further detail.

The transmit path is digital in nature from the digital signal processor until the digital-to-analog converter 360. Data from the DSP is provided to the programmable gain amplifier 310 of the transmit block. Programmable gain amplifier 310 provides amplification in the range of 0 to −3 dB. Attenuation may be used to adjust the power level, if desired.

The xDSL line coding requires orthogonality between carriers. Orthogonality may be achieved through the use of DSP FFT algorithms. In one embodiment, the xDSL circuitry supports an ADSL protocol with a 138 KHz (32 tones) upstream data rate. Although the Nyquist sampling frequency for a 138 KHz upstream signal is 276 KHz, DSP 270 performs a Fast Fourier Transform at twice the necessary sampling rate (i.e., 552 KHz or 128 points instead of the 64 points typically used to process the 32 tones) to eliminate the even images of the upstream data and to force the spectrum content to zero for frequencies between 142 KHz and 276 KHz. Thus in one embodiment, DSP 270 is providing upstream data values to the transmit block at 552 KHz.

A high pass filter 320 is provided to reduce spectral leakage at low frequencies caused by DSP FFT algorithms. In one embodiment, high pass filter 320 is a third order Butterworth filter with a corner frequency of approximately 12 KHz and rejection greater than 28 dB for frequencies of approximately 4 KHz or less.

Interpolator 330 interpolates the filtered signal from 552 KHz to 1.104 MHz for spectral power shaping. In one embodiment, interpolator 330 is a $4^{th}$ order interpolator. The transfer function for interpolator 330 is as follows:

$$h(z)_{330} = \left(\frac{1}{N} \cdot \frac{1-z^{-N}}{1-z^{-1}}\right)^4$$

The ratio of the interpolator frequencies determines $$N\left(N = \frac{f_{sout}}{f_{sin}}\right).$$

Thus, $$N = \frac{1.104 \text{ MHZ}}{552 \text{ KHZ}} = 2.$$

The interpolated signal is processed by a power spectral density (PSD) mask or shaper 340 to ensure compliance with protocol specifications. In one embodiment PSD shaper 340 incorporates a $6^{th}$ order Chebyshev filter designed to attenuate the signal by approximately 40 dBm/Hz. In one embodiment, PSD shaper 340 has a corner frequency of approximately 140 KHz.

Interpolator 350 interpolates the power shaped signal from 1.104 MHz to 35.328 MHz for the purpose of rejecting upstream images. In one embodiment, interpolator 350 is a $6^{th}$ order interpolator. The transfer function for interpolator 350 is as follows:

$$h(z)_{350} = \left(\frac{1}{N} \cdot \frac{1-z^{-N}}{1-z^{-1}}\right)^6.$$

In this case, $$N = \frac{35.358 \text{ MHZ}}{1.104 \text{ MHZ}} = 32.$$

Digital-to-analog converter (DAC) 360 generates an analog signal from the interpolated signal. The analog signal is provided to low pass filter 370. Due to the lack of even images, high DAC sampling rate, and the high rejection of the overall transmit path digital filter, low pass filter 370 may be implemented as a first order filter to reject undesired upstream images. In one embodiment, low pass filter 370 has a corner frequency of approximately 250 KHz. Driver 380 drives the upstream signal onto the subscriber line 290.

Referring to FIG. 2, receive block 240 interfaces with subscriber line 290 through hybrid 260. In one embodiment, hybrid 260 is a tunable, first order filter. The hybrid network is discussed in further detail with respect to FIGS. 5–6.

Figure 4:
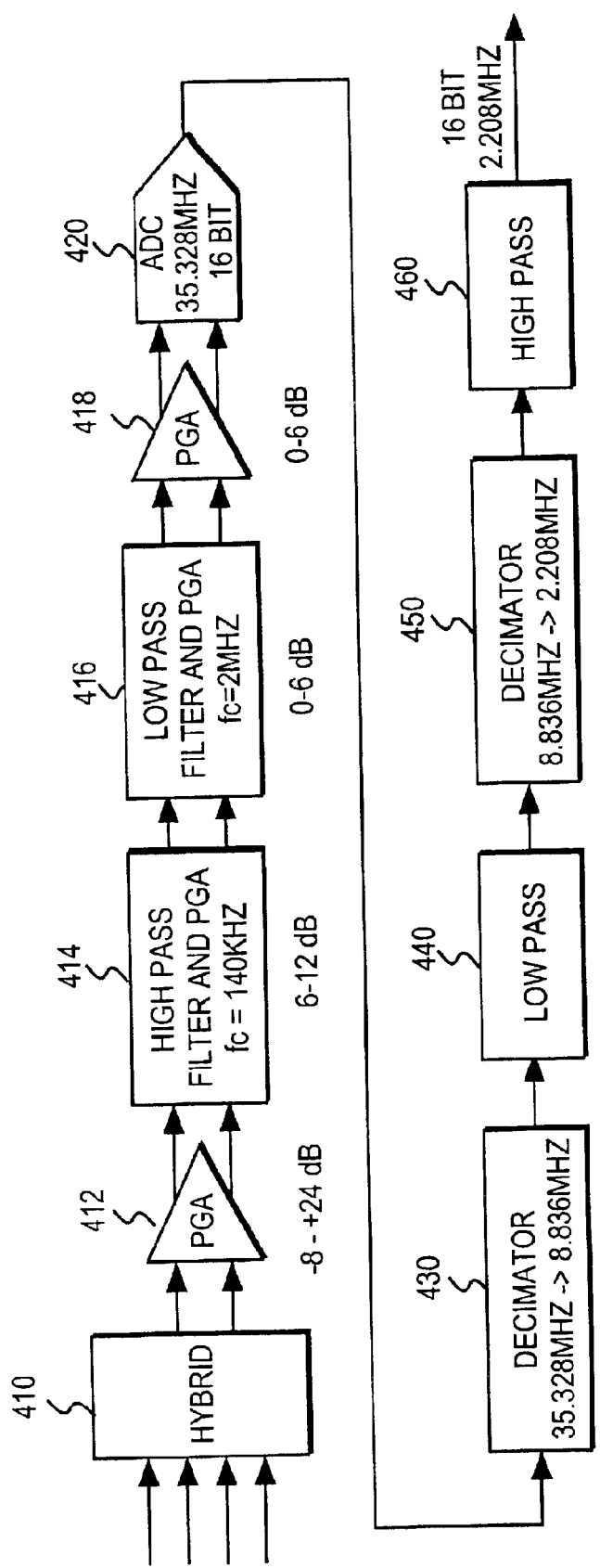
FIG. 4 illustrates the analog front end receive block.

FIG. 4 illustrates receive block 240 in greater detail. The 4 wire signal carrying the transmitted signal as well as any received communications are passed through hybrid 410 to perform echo cancellation and to convert the 4 wires to 2 wires carrying predominately the received communications. A first programmable gain amplifier (PGA 412) permits gain adjustments from –8 to 24 dB. Attenuation may be necessary in some cases due to line conditions. The signal is then provided to high pass filter and PGA 414 to further reduce upstream communications in the receive path. High pass filter also permits gain adjustments from approximately 6–12 dB.

In one embodiment, high pass filter 414 is a $3^{rd}$ order filter with a corner frequency of approximately 140 KHz to provide approximately 20 db rejection to the upstream signal. The use of the high pass filter and PGA 414 may be preferable to the use of DACs to cancel near-end signals. Traditional DAC cancellation techniques do not account for driver noise or distortion.

The filtered signal is provided to low pass filter and PGA 416. Low pass filter and PGA 416 permits gain adjustments from approximately 0–6 dB. In one embodiment, low pass filter 416 is a $2^{nd}$ order filter with a corner frequency of approximately 2 MHz. The primary purpose of low pass filter and PGA 416 is to provide anti-aliasing for analog-to-digital converter (ADC) 420. The signal is passed through another programmable gain amplifer 418 to provide for additional level control before being processed by ADC 420.

In one embodiment, ADC is a $3^{rd}$ order sigma-delta converter. Decimator 430 serves to reduce the truncation noise contributed by ADC 420 at higher frequencies due to the sigma-delta effect. The digital signal is decimated from 35.328 MHZ to 8.836 MHZ.

The output of decimator 430 is provided to a programmable low pass filter 440. Low pass filter provides outband rejection to prevent the outband signal from folding back into the baseband signal. In one embodiment low pass filter 440 is a $6^{th}$ order filter. After low pass filter 440, the signal is passed to decimator 450 which decimates the signal from 8.836 to 2.208 MHz (the baseband frequency). The decimated signal is processed by high pass filter 460 before the 16 bit 2.208 MHz data is provided to a DSP. High pass filter 460 serves to reject any remaining audio (i.e., voiceband) components in the processed signal. In one embodiment, high pass filter 460 is a $2^{nd}$ order filter.

Figure 5:
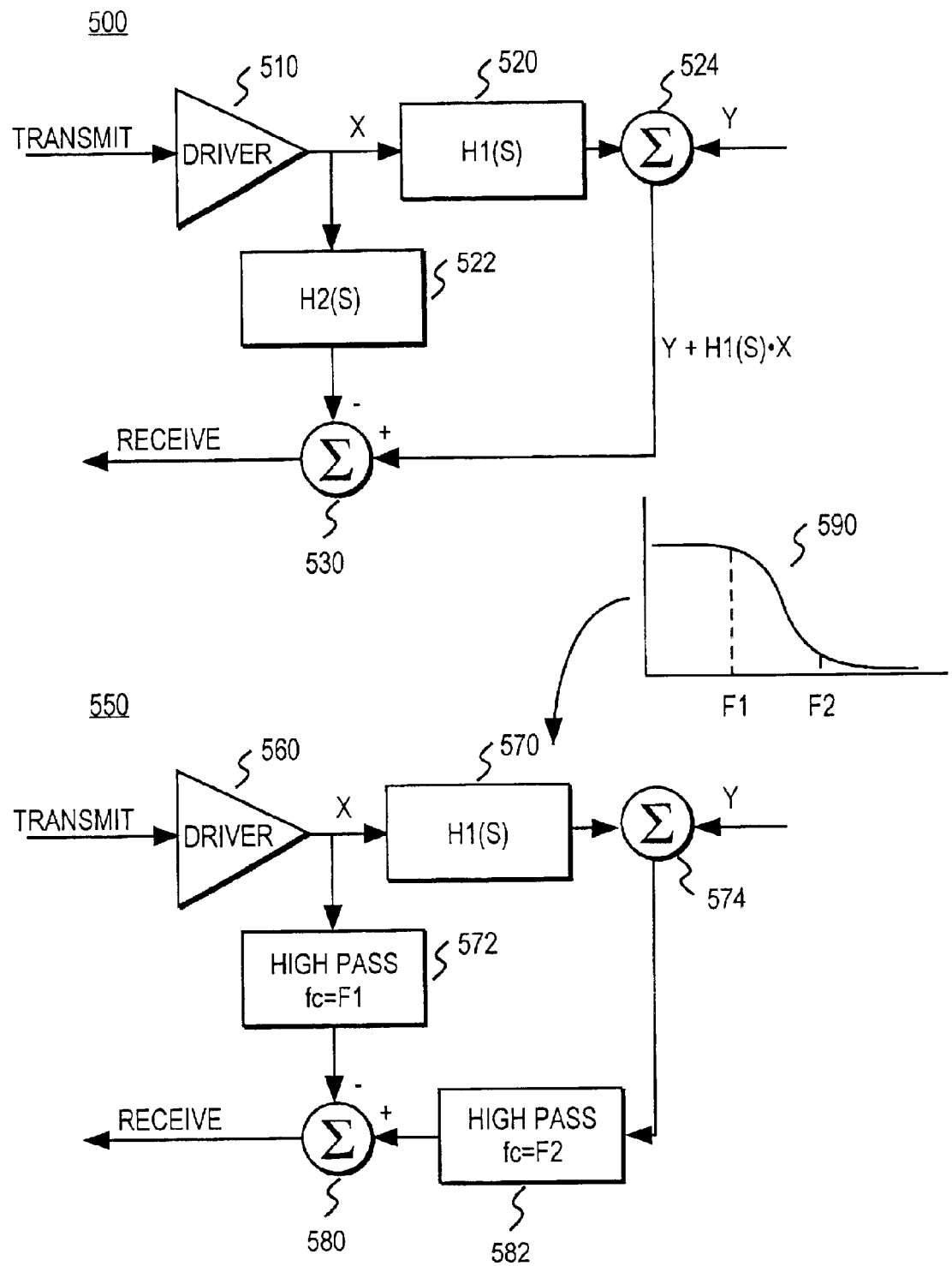
FIG. 5 illustrates various hybrid network implementations.

FIG. 5 compares a system level view of a hybrid network (550) with another hybrid (500). The hybrid is designed in part to cancel the signal X being transmitted onto the subscriber line so that the large transmit signal is not re-introduced into the receive path. The signal X transmitted by the driver 510 is distorted by the transformer and line impedance in a manner modeled as H1(s) 520. The receive path sees a superposition of the desired input signal Y and X·H1(s). H2(s) 522 is designed to introduce the same distortion as H1(s) 520. When combined by differential summer 530, the result is Y+X·H1(s)–X·H2(s). If H1(s)= H2(s), the received result is the desired result, i.e., Y.

One disadvantage with this approach is that the desired receive signal, Y, is usually much smaller than X. Differential summer 530 is taking the difference of two larger values in order to identify a smaller value. This tends to introduce noise into the system. Another disadvantage is that H2(s) is a pole/zero filter which does not block DC. Furthermore, the pole and zero are difficult to adjust independently in practical implementations. An alternative hybrid network is illustrates as 550 for comparison.

In this case H1(s) 570 modifies X such that the receive path sees Y+H1(s)·X. A graphical representation of a typical H1(s) is illustrated in chart 590. The typical H1(s) has a zero at F1 and a pole at F2. A high pass filter 582 with a corner frequency of F2 is inserted into the receive path to produce HPF2(s)·(Y+H1(s)·X). Another high pass filter 572 with a corner frequency F1 is applied to the transmitted signal X to produce HPF1(s)·X. Differential summer 580 thus produces, HPF2(s)·Y+HPF2(s)·H1(s)·X–HPF1(s)·X.

The corner frequency of high pass filter 572 produces a pole which offsets a zero of H1(s) at the same location. The product of both filters appears as another high pass filter with a corner frequency of F1. High pass filter 570 is selected such that HPF2(s)·H1(s)=HPF1(s). Thus the hybrid is able to reject the transmitted signal, X.

One advantage of this approach is that filters 572 and 582 are the same type of filter. Moreover, filters 572 and 582 are first order filters. Filters 572 and 582 may be realized, for example, with capacitors and resistors. An added benefit is that high pass filters provide DC isolation and some rejection of the voiceband signal.

Figure 6:
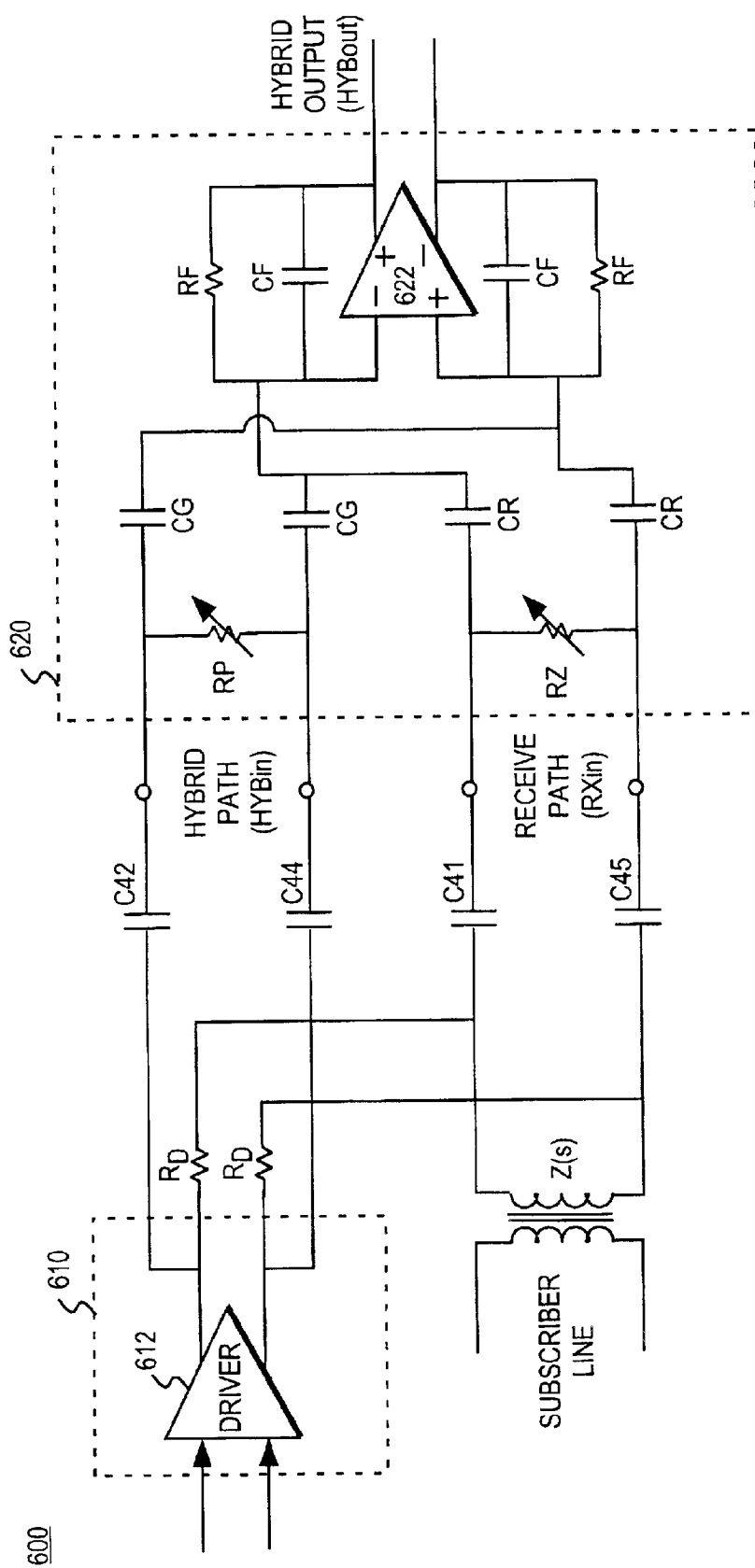
FIG. 6 illustrates one embodiment of a tunable hybrid.

FIG. 6 illustrates one embodiment of hybrid 260 in greater detail. Hybrid network 620 includes a hybrid input port, a hybrid output port, and a receive path input port. Driver 612 is coupled to provide the upstream data signal to the subscriber line through resistors $R_D$. The driver is capacitively coupled to the hybrid input for provide the upstream data signal to the hybrid network. The receive path is capacitively coupled to the subscriber line for receiving the composite signal including the upstream and downstream data signals. Capacitors $C_{41}$, $C_{42}$, $C_{44}$, and $C_{45}$ provide DC isolation for the hybrid's transmit and receive paths.

A first order model approximates the subscriber line impedance, Z(s), as a series-coupled resistor $R_x$ and capacitor $C_x$. The transfer function from the driver 610 output to the receiver input has a dominant zero and a dominant pole as follows:

$$h_{drv\_to\_rxin}(s) = \frac{Z(s)}{R_D + Z(s)} = \frac{1 + sC_x R_x}{1 + sC_x(R_x + 2R_D)}$$

The transfer function between the hybrid receive and hybrid output is as follows:

$$h_{rxin\_to\_HYBout}(s) = K_{rx} \cdot \frac{s}{s + HYB0}$$

such that the composite transfer function between the hybrid receive input and the hybrid output is a high pass function as follows:

$$h_{drv\_to\_rxin\_toHYBout}(s) = K_{rx} \frac{1 + sC_x R_x}{1 + sC_x(R_x + 2R_D)} \cdot \frac{s}{s + HYB0},$$

where $K_{rx}$ is the receive path gain (i.e., the hybrid circuit gain) and HYB0 is the pole of the high pass transfer function (i.e., the hybrid zero). HYB0 is used to minimize the effect of the dominant zero $(1+sC_x R_x)$ due to line impedance. HYB0 is below 140 KHz so the receive signal is not significantly affected by the hybrid zero. The receive path gain, $K_{rx}$, is controlled by the values of capacitors CR and CF as follows:

$$K_{rx} = \frac{CR}{CF}$$

A hybrid path is used to minimize the effect of the remaining dominant pole $(1+sC_x(R_x+2R_D))$. The transfer function from the driver output to the hybrid output through the hybrid path is as follows:

$$h_{drv\_to\_HYBin\_to\_HYBout}(s) = K_{HYB} \cdot \frac{s}{s + HYBP}$$

HYBP is the hybrid pole. $K_{HYB}$ may be adjusted for different receive path gains ($K_{rx}$) such that $$K_{HYB} \cdot \frac{s}{s + HYBP} - K_{rx} \cdot \frac{1 + sC_x R_x}{1 + sC_x(R_x + 2R_D)} \cdot \frac{s}{s + HYB0} \to 0$$

The hybrid path gain, $K_{HYB}$, is controlled by the values of capacitors CG and CF as follows:

$$K_{HYB} = \frac{CG}{CF}$$

The hybrid pole and zero are determined from the components of FIG. 6 as follows:

$$HYB0 = \frac{C_{41} + C_{45}}{R_Z \cdot C_{41} \cdot C_{45}}$$

$$HYBP = \frac{C_{42} + C_{44}}{R_P \cdot C_{42} \cdot C_{44}}$$

Thus $$K_{HYB} = K_{rx} \cdot \frac{1 + sC_x R_x}{1 + sC_x(R_x + 2R_D)} \cdot \frac{s + HYBP}{s + HYB0}$$

Substitution indicates $K_{HYB}$ may be calculated as follows:

$$K_{HYB} = K_{rx} \cdot \frac{1 + sC_x R_x}{1 + sC_x(R_x + 2R_D)} \cdot \frac{s + \frac{C_{42} + C_{44}}{R_P \cdot C_{42} \cdot C_{44}}}{s + \frac{C_{41} + C_{45}}{R_Z \cdot C_{41} \cdot C_{45}}}$$

Hybrid 260 is thus a tunable low order hybrid. HYB0 is adjusted to cancel or ameliorate the zero defined by $(1+sC_x R_x)$. When properly tuned, hybrid 260 is effectively a first order hybrid. HYBP and $K_{HYB}$ are adjusted to cancel the effects of gain $K_{rx}$ and pole $1+sC_x(R_x+2R_D)$. The optimal $K_{HYB}$ is programmed accordingly. Circuitry 620 is a capacitor coupled amplifier which has almost no noise from the passive components. The feedback resistors (RF) for 622 serve as DC stabilizing resistors. When the values for RF are large, the resistors will contribute little noise. The first order hybrid may be implemented on the same substrate as the remainder of the analog front end. The high pass filter 414 following the hybrid further reduces the remaining driver signal before the receive signal is digitized by ADC 420.

A crystal oscillator is used to generate all the necessary clock signals for the digital portion of the analog front end. Although there is some choice in selection of the crystal frequency, the selected crystal must support the DMT 4.3125 KHz channel separation. Accordingly, the selected crystal should have a resonant frequency that is a multiple of 4.3125 KHz. In one embodiment, the selected crystal is a 35.328 MHz crystal.

Referring to FIG. 2, analog front end 218 can be configured to support a voiceband channel for voiceband modem communications concurrent with the non-voiceband (i.e., xDSL) communications. The voiceband channel circuitry may be integrated on the same integrated circuit die as the xDSL circuitry, if a single clock is used for synchronization. Voiceband communications, however, have a bandwidth of approximately 4 KHz and nominal baseband sampling rates of 8 KHz. These values are not immediately compatible with the requirements of the xDSL circuitry having 4.3125 KHz bandwidth subchannels. The use of multiple independent clocks may otherwise interfere with the operation of at least one of the xDSL or voiceband circuitry due to intermodulation and other undesirable effects resulting from multiple clocks.

Referring to FIG. 2, sample rate conversion is used to derive the other clock frequencies so that multiple independent clocks can be avoided. Synchronous sample rate conversion is used to achieve the various clock rates through combinations of upsampling by an integer factor and downsampling by an integer factor. Sample rate conversion block 210 includes a transmit path and a receive path which are illustrated in greater detail in FIGS. 7–8. Actual sample rate conversion is handled by blocks 741, 750, and 752 of FIG. 7 and blocks 844, 850, and 860 of FIG. 8. The remaining blocks condition the signal before or after sample rate conversion.

In one embodiment, the voiceband portion of the analog front end supports a number of clock frequencies including those in the set S={7200, 8000, 8229, 8400, 9000, 9600, and 10,286 Hz}. A variety of clock frequencies allows flexibility in negotiating a common baud rate with another modem. A universal conversion speed (i.e., intermediate frequency) is selected which can be derived from any of the required original rates by integer upsampling and downsampling. The appropriate upsampling and downsampling integers may be programmatically selected depending upon what baud rate the user is attempting to communicate with. Subsequent digital processing is handled at pre-determined intermediate frequencies independently of the original frequency.

The sampling frequency $f_s$, is selected such that $$f_s = \frac{f_o}{n},$$

where n is an integer and $f_0$ is divisible by n such that $f_o$ mod(n)=0. In one embodiment, n=32 so that $$f_s = \frac{35.328 \text{ MHz}}{32} = 1.104 \text{ MHz}.$$

The conversion speed, $f_{audio}$, is selected judiciously such that for every $f_i$ in S there exists integers $M_i$ and $N_i$ such that $$f_i = \frac{M_i}{N_i} f_{audio}$$

In one embodiment, the selected universal conversion speed is 9600. Table 900 of FIG. 9 illustrates nominal M and N values when converting analog signal rates to the same universal conversion speed of 9600 for further digital processing. Common multiples of M and N help to reduce the number of distinct Ms or Ns while maintaining the same ratio. Thus instead of the fully reduced values of column 2, the use of reducible ratios requires only 3 distinct M: 6, 14, and 16. Although a least common multiple could be used to further reduce M, higher values may not be desirable for N or for digital filters such as finite impulse response filter 750. Thus column 3 illustrates the ratios optimized to minimize the number of distinct Ms for small M. The ratios provide precise conversions except for 10,286 and 8229 which have errors less than 0.5 Hz as required by ITU standards.

Figure 7:
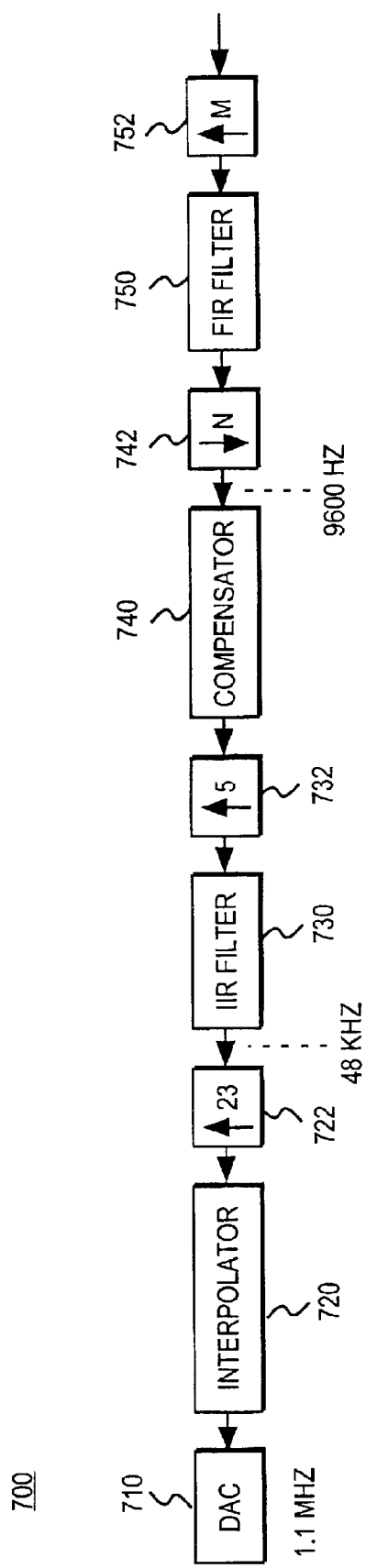
FIG. 7 illustrates a voiceband transmit path with sample rate conversion.

Referring to the transmit path 700 of FIG. 7, the optimum M and N are selected from column 3 in accordance with the selected analog speed from Table 900. Thus, for example, if the selected analog speed is 7200, then M=16 and N=12. Block 752 upsamples the audio signal by M. The upsampled signal is provided to finite impulse response (FIR) filter 750. The reduction in the total number of Ms reduces the number of filters required and therefore the memory required for filter coefficients. After digital filtering, the filtered signal is downsampled by N in block 742. The data is now at the universal conversion speed of 9600. The downsampled signal is passed to compensator 740 to shape the frequency response before upsampling. Compensator 740 provides frequency compensation at high frequencies.

In block 732, the compensated signal is upsampled by 5 and then filtered by infinite impulse response filter 730 to eliminate images introduced by the upsampling. The filtered signal is upsampled again by 23 in block 722. The upsampled signal is then passed to interpolator 720 to eliminate the images introduce by the second round of upsampling. In one embodiment, the 23 times upsampling and the interpolation are performed by the same filter. The interpolated signal is then provided to DAC 710.

The frequency corner for the interpolator is selected to ensure adequate attenuation of signal images as well as no aliasing in the decimation process. This requires the FIR 750 cut-off frequency to be the smaller of the interpolation and decimation cut-off frequencies.

Figure 10:
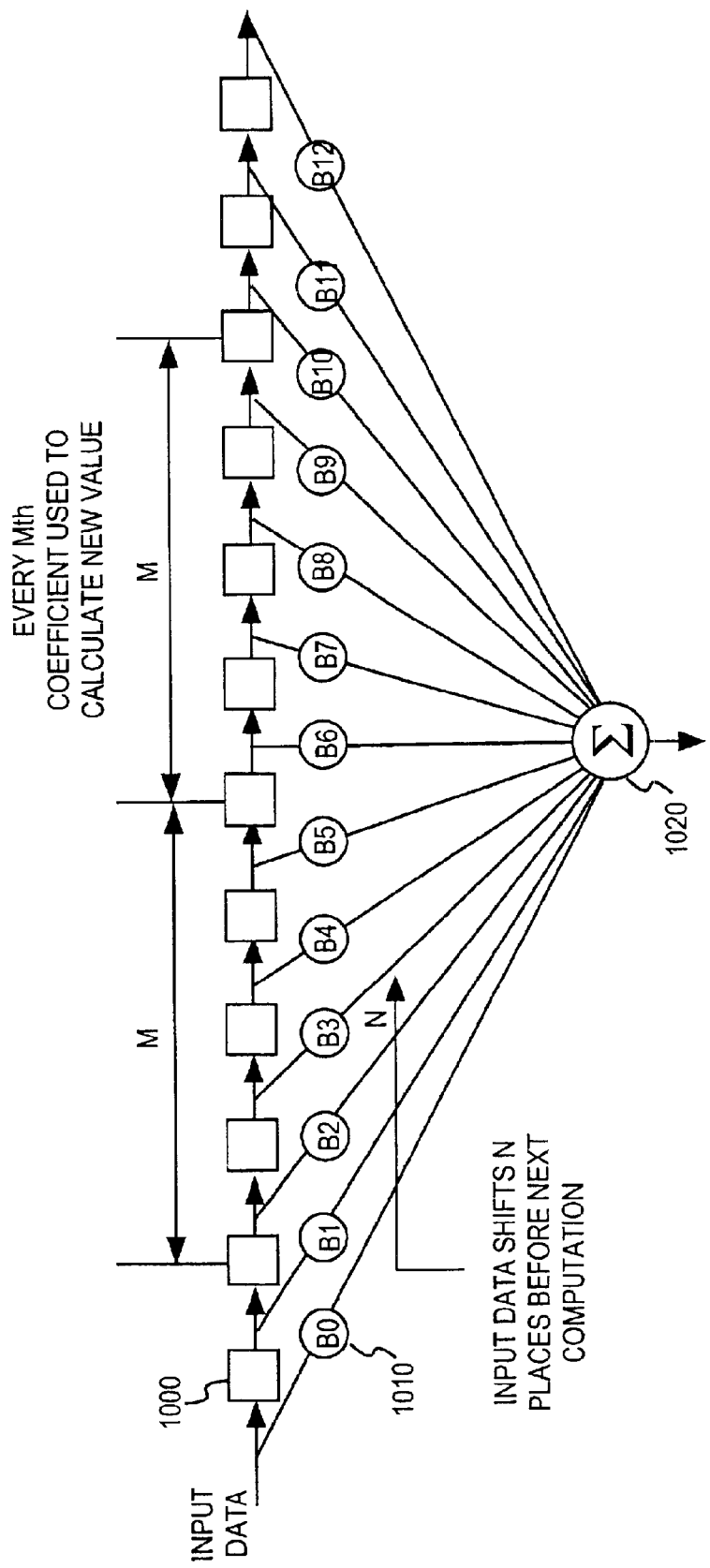
FIG. 10 illustrates one embodiment of a finite impulse response filter.
Figure 11:
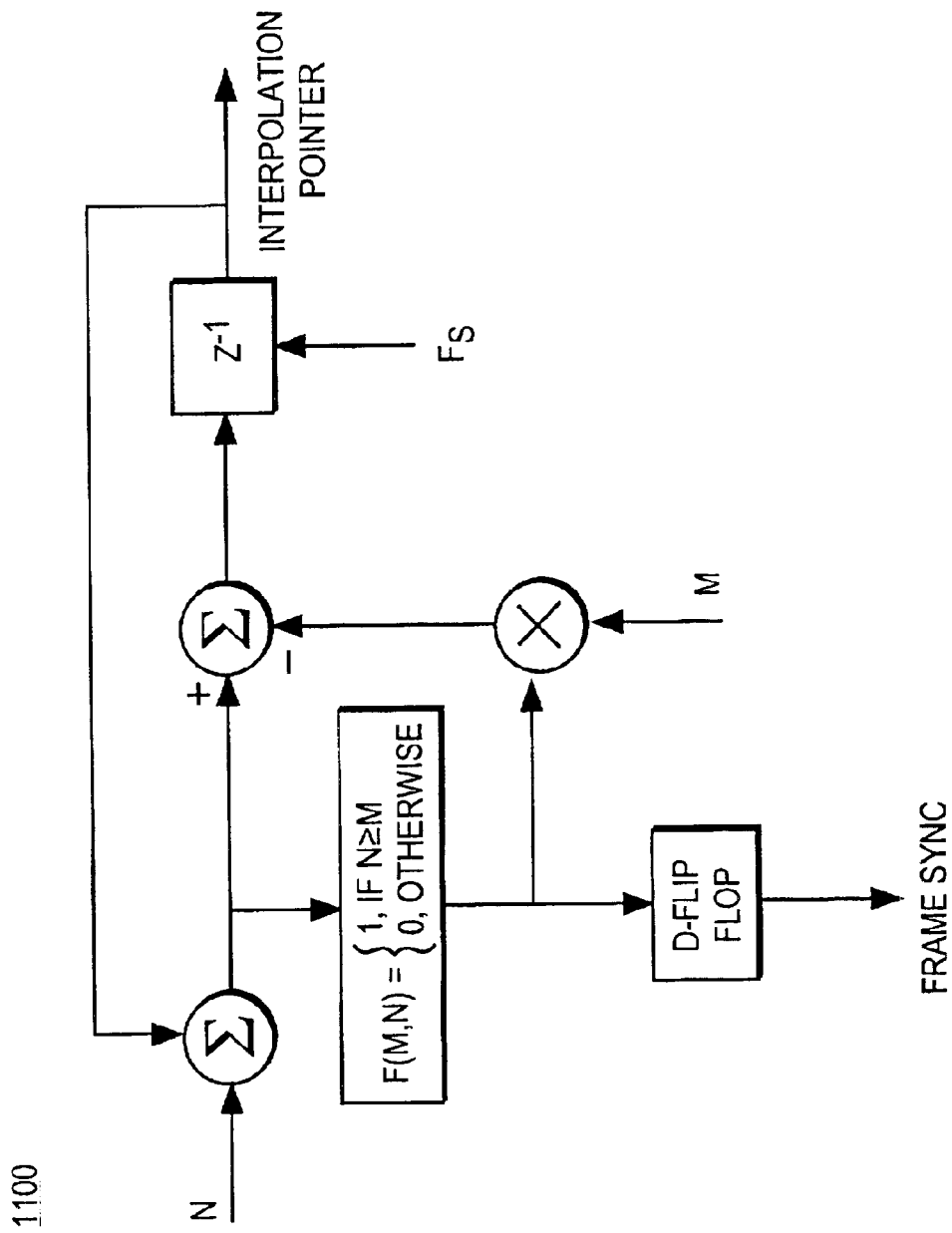
FIG. 11 illustrates one embodiment of a polyphase pointer and serial interface pulse generator.

FIG. 10 illustrates the operation of FIR 750. The FIR comprises a plurality of samples 1000 of the input data. Each sample 1000 is delayed with respect to its adjacent sample. Each tap has an associated coefficient 1010. The products of the coefficients 1010 and their associated tap values (from a preceding sample) are computed and then summed by adder 1020 to produce a result. In the particular instance, every M coefficients 1010 is used to calculate a new output value. The input data shifts N places between calculation of output values. When interpolating, a number of the input sample values will have a zero value. FIG. 11 illustrates a polyphase pointer and serial interface pulse generator 1100 for the FIR of the AFE's transmit path.

Figure 8:
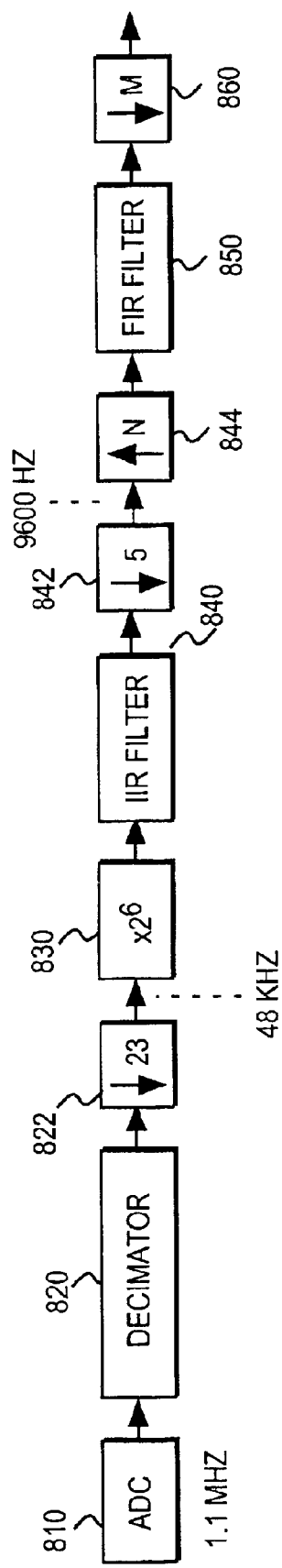
FIG. 8 illustrates a voiceband receive path with sample rate conversion.

FIG. 8 illustrates the receive or downstream path 800. ADC 810 samples at 1.104 MHz. The resulting digital signal is passed to decimator 820. The decimated signal is downsampled by 23 in block 822. In one embodiment, the functions of downsampling by a factor of 23 and decimation are performed by the same filter. At this point the data is being communicated at 48 KHz. Block 830 scales the data values, if necessary, to accommodate computational requirements of filters 840 and 850. In one embodiment, block 830 scales the data values by 64. Infinite impulse response filter (IIR) 840 is applied to remove the outband signals that may be aliased to the baseband range of 9600 Hz to 48 KHz. The resulting data is downsampled by a factor of 5 in block 842. At this point the data is a 9600 Hz signal.

Figure 12:
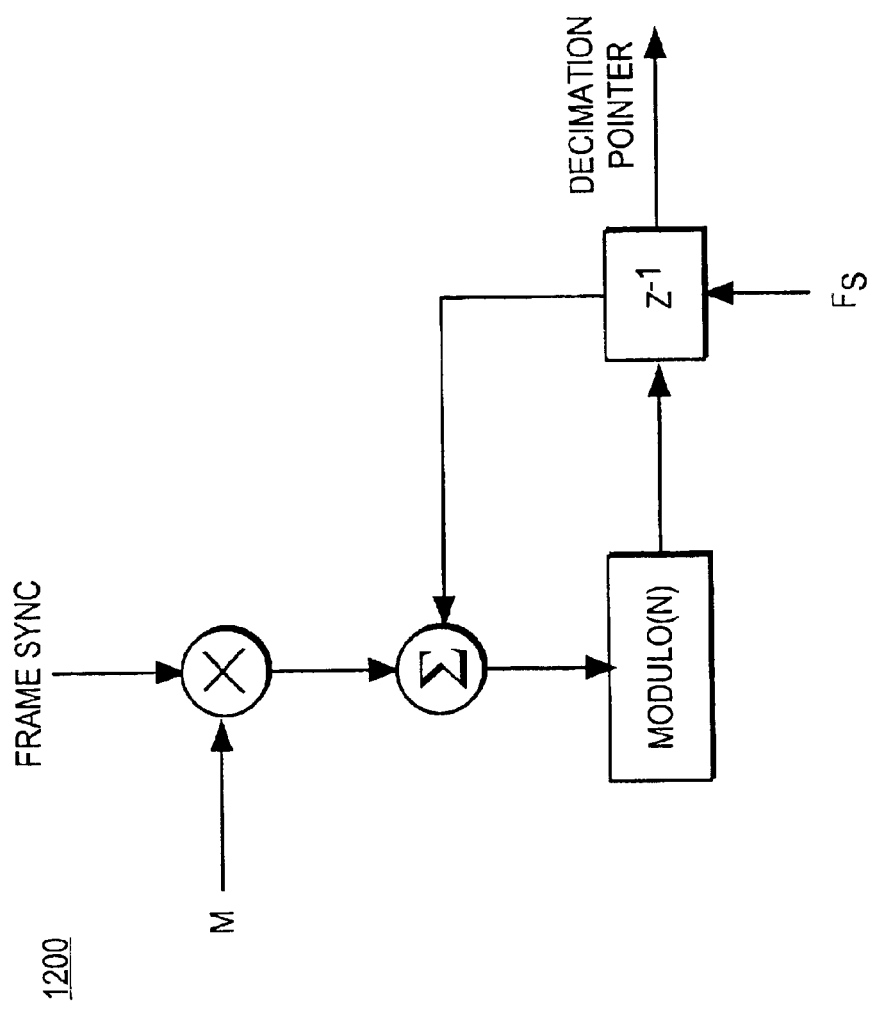
FIG. 12 illustrates one embodiment of a polyphase pointer for the receive path of FIG. 8.

M and N are selected again based on the pre-determined analog speed from Table 900. Block 844 upsamples the signal by N before providing the upsampled signal to FIR filter 850. The signal is then downsampled by M so that it has the proper rate for the voiceband channel. FIG. 12 illustrates one embodiment of a polyphase pointer for the receive path of FIG. 8.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An analog front end apparatus, comprising:
   a) a transmit block coupled to transmit discrete multitone modulated upstream data to a subscriber line, wherein the transmit block digitally filters the upstream data;
   b) a hybrid network coupled to the subscriber line and the transmit block; and c) a receive block coupled to the hybrid for receiving discrete multitone modulated downstream data from the subscriber line, wherein the transmit block, hybrid network, and receive block reside within a same integrated circuit package.

2. The apparatus of claim 1 wherein the hybrid is a first order hybrid network.

3. The apparatus of claim 1 wherein the hybrid is tunable.

4. The apparatus of claim 1 wherein the hybrid is DC isolated from the transmit and receive blocks of the analog front end.

5. The apparatus of claim 1 wherein the transmit block further comprises:
  i) a first interpolator coupled to interpolate the upstream data from a first clock rate to a second clock rate greater than the first clock rate;
  ii) a power spectral density shaping filter coupled to shape the power spectrum of the interpolated upstream data; and
  iii) a second interpolator coupled to interpolate the shaped signal to a third clock rate greater than the second clock rate.

6. The method of claim 5 wherein $c_2$=1.104 MHz.

7. The method of claim 5 wherein $c_3$=35.328 MHz.

8. The apparatus of claim 1 wherein the transmit block, hybrid network, and receive block are fabricated on a same integrated substrate to form a complementary metal oxide semiconductor (CMOS) integrated circuit.

9. A method comprising the steps of:
  a) receiving a discrete multitone modulated upstream data signal at a first clock rate, $c_1$;
  b) interpolating the upstream signal to a second clock rate $c_2 > c_1$;
  c) processing the interpolated signal through a power shaping power spectral density shaping filter;
  d) interpolating the power shaped signal to a third clock rate $c_3 > c_2$; and
  e) converting the twice interpolated signal to an analog signal.

10. The method of claim 9 further comprising the step of pre-processing the received upstream data signal to substantially eliminate even images.

* * * * *